United States Patent [19]

Tervamäki et al.

[11] Patent Number: 4,554,134

[45] Date of Patent: Nov. 19, 1985

[54] PIPETTE WITH ADJUSTABLE VOLUME

[75] Inventors: Jukka Tervamäki; Mikael Fagerstedt; Aarre Kukka, all of Helsinki; Erkki Kaski, Luvia, all of Finland

[73] Assignee: Labsystems Oy, Helsinki, Finland

[21] Appl. No.: 579,885

[22] PCT Filed: Jun. 21, 1983

[86] PCT No.: PCT/FI83/00051

§ 371 Date: Feb. 2, 1984

§ 102(e) Date: Feb. 2, 1984

[87] PCT Pub. No.: WO84/00119

PCT Pub. Date: Jan. 19, 1984

[30] Foreign Application Priority Data

Jun. 29, 1982 [FI] Finland ................................ 822307

[51] Int. Cl.[4] ............................................ G01N 1/14

[52] U.S. Cl. ................................ 422/100; 73/864.18; 222/309

[58] Field of Search .................... 73/864.18; 74/10.41, 74/527; 422/100; 222/309

[56] References Cited

U.S. PATENT DOCUMENTS

| | | | |
|---|---|---|---|
| 2,023,219 | 12/1935 | De Reamer | 74/527 |
| 2,288,722 | 7/1942 | Lear et al. | 74/527 |
| 2,357,940 | 9/1944 | Du Lude | 74/527 |
| 2,505,548 | 4/1950 | Hutt | 74/10.41 X |
| 3,013,435 | 12/1961 | Rodrigues | 73/864.18 |
| 3,230,793 | 1/1966 | Allison | 74/527 |
| 3,260,805 | 7/1966 | Pihl | 74/527 X |
| 3,506,164 | 4/1970 | Weichselbaum et al. | 222/340 |
| 3,810,391 | 5/1974 | Suovaniemi | 73/864.18 |
| 3,827,305 | 8/1974 | Gilson et al. | 73/864.18 |
| 3,986,410 | 10/1976 | Robinson | 74/10.41 X |
| 4,071,720 | 1/1978 | Krajci | 74/527 X |
| 4,141,250 | 2/1979 | D'Autry | 222/309 X |
| 4,250,755 | 2/1981 | Kenney | 73/864.18 X |
| 4,284,604 | 8/1981 | Tervamaki | 422/100 |
| 4,466,298 | 8/1984 | Tervamaki et al. | 422/100 X |

*Primary Examiner*—David L. Lacey
*Assistant Examiner*—Michael S. Gzybowski
*Attorney, Agent, or Firm*—Hopgood, Calimafde, Kalil, Blaustein & Judlowe

[57] ABSTRACT

A pipette with adjustable volume, which pipette comprises a frame portion (1) shaped as a handle, a cylinder (2) being formed inside the said frame portion, as well as a piston (3) fitted into the cylinder by means of a seal ring (7), a piston rod (4) connected to the piston (3), as well as a press knob (5) with shaft (6), fitted at the upper end of the frame portion (1). By turning the said press knob (5), a sleeve (20), which determines the upper position of the piston (3) and which is non-rotable in relation to the frame portion (1) of the pipette, can be displaced, by means of a threaded joint (20), upwards or downwards relative the shaft (6) of the knob so as to adjust the volume of the pipette. The pipettable volume can be read numerically through an opening or window (40) in the pipette frame (1) by means of a series of rings consisting of numbered disc-shaped rings (31, 39). According to the invention, above the uppermost ring (31) in the series of rings, a ring-shaped spring (33) is fitted non-rotably in relation to the frame portion (1) of the pipette, the bottom face of the said ring-shaped spring (33) being provided with globular projections (34) designed to be jointly operative with notches provided in the end face of the ring (31), so as to lock the ring (31) gently in the desired volume positions.

2 Claims, 4 Drawing Figures

PIPETTE WITH ADJUSTABLE VOLUME

The present invention is concerned with a pipette with adjustable volume, which pipette comprises a frame portion shaped as a handle, a cylinder being formed inside the said frame portion, as well as a piston fitted into the cylinder by means of a seal ring, a piston rod connected to the piston, as well as a press knob with shaft, fitted at the upper end of the frame portion, and that, by turning the said press knob, a sleeve, which determines the upper position of the piston and which is non-rotable in relation to the frame portion of the pipette, can be displaced, by means of a threaded joint, upwards or downwards relative the shaft of the knob so as to adjust the volume of the pipette, and that the pipettable volume can be read numerically through an opening or window in the pipette frame by means of a series of rings consisting of numbered discshaped rings.

In prior art, several pipettes of the type concerned are known, but their construction is complicated or therein it is difficult to lock the volume at a desired value.

The pipette in accordance with the present invention is mainly characterized in that, above the uppermost ring in the series of rings, a ring-shaped spring is fitted non-rotably in relation to the frame portion of the pipette, the bottom face of the said ring-shaped spring being provided with globular projections designed to be jointly operative with notches provided in the end face of the ring, so as to lock the ring gently in the desired volume positions.

Figure 1:
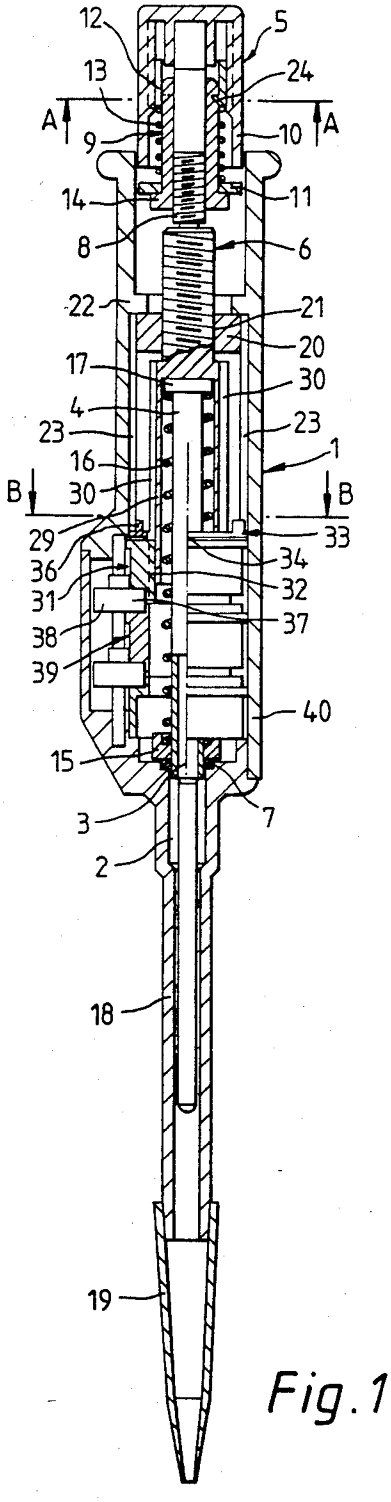
Figure 2:
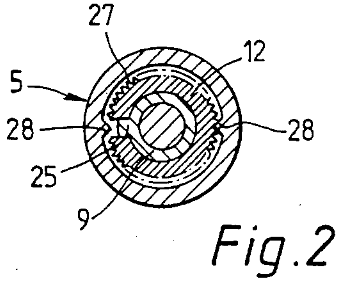
Figure 3:
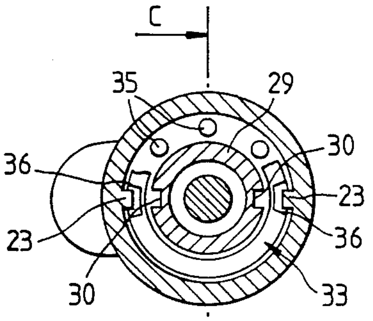
Figure 4:
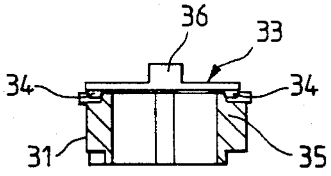

The invention comes out in more detail from the following description and from the attached drawing, wherein FIG. 1 is a sectional side view of a pipette in accordance with the invention, FIG. 2 shows a section along line A—A in FIG. 1, FIG. 3 shows a section along line B—B in FIG. 1, and FIG. 4 shows a section along line C—C in FIG. 3.

The frame portion 1 of the pipette, shaped as a handle, contains a cylinder 2, into which a piston 3 has been fitted by means of a seal ring 7. The seal ring 7 is kept in position in its groove by a ring flange 15 fitted above the ring, which ring flange is pressed downwards by a spiral spring 16 fitted around the piston rod 4 between the ring flange 15 and a flange portion 17 at the upper end of the piston rod 4. A disposable tip vessel 19 is attached to the lower end of the tip tube 18 connected to the lower part of the cylinder 2 in the frame part 1 of the pipette. The upper end of the piston rod 4 is pressed against the lower end of the shaft 6 of the press knob 5. A sleeve 20 is fitted by means of a threaded joint 21 around the shaft 6 of the press knob. Inside the frame portion 1 of the pipette, there is an annular limiter flange 22, against whose lower face the sleeve 20 rests by means of its upper face. In this way, the sleeve 20 together with the annular flange 22 determines the upper position of the piston 3. The inside of the frame portion 1 of the pipette is provided with longitudinal guides 23, and the sleeve 20 is provided with notches corresponding to the said guides 23, whereby the guides 23 and the notches prevent rotation of the sleeve 20 in relation to the frame portion 1 of the pipette, but permit axial gliding of the sleeve 20 inside the frame portion 1 of the pipette.

Above the adjustment thread 21 of the press knob shaft 6, on the press knob shaft 6 there is the calibration thread 8. The diameter and the pitch of the calibration thread 8 may be either the same as, or different from, those of the adjustment thread 21. By means of the calibration thread, a calibration sleeve 9 is fitted around the shaft 6 of the press knob 5, by means of which sleeve 9 the lower limit of the movement of the piston 3 during pipetting can be determined. As surrounded by the mantle 10 of the hollow press knob 5 and by the upper portion of the pipette frame 1, the calibration sleeve 9 is placed at a distance both from the mantle 10 of the press knob 5 and from the inside face of the cover of the upper part of the pipette frame 1. For the secondary movement of the pipette, an annular flange 11 is fitted in the annular space between the calibration sleeve 9 and the pipette frame 1, around the calibration sleeve 9, which annular flange 11 is pressed downwards against a limiter flange 14 placed at the lower portion of the calibration sleeve 9 by a spiral spring 13 placed around the calibration sleeve 9 and fitted between the said annular flange 11 and a ring piece 12 attached to the upper end of the calibration sleeve 9. As comes out from FIG. 2, the ring piece 12 is cut off at one point, and, as the ring piece 12 and the calibration sleeve 9 are, in the way coming out from FIG. 1, provided with jointly operative notches 24, the ring piece 12 can be readily attached to the upper end of the calibration sleeve 9 by just pressing. According to FIG. 2, there is a projection 25 at the upper end of the calibration sleeve 9 facing the ring piece 12, at which projection the cut-off point of the ring piece 12 is placed when the ring piece 12 is fitted to the end of the calibration sleeve 9. Thereby the projection 26 prevents the ring piece 12 from rotating in relation to the calibration sleeve 9. The calibration can be performed by means of the ring piece 12 by turning the calibration sleeve 9 around the shaft 6 of the press knob 9. The press knob 5 is attached to the shaft 6 of the press knob non-rotably in the way illustrated in FIG. 2. The ring piece 12, attached to the calibration sleeve 9 non-rotably, is, at its outer face, provided with vertical grooves 27, and the inside face of the mantle of the press knob 5 is provided with vertical locking wedges 28, positioned in the way shown in FIG. 2, as means jointly operative with the said grooves 27. If the press knob 5 is pulled apart, the calibration sleeve 9 may be turned in relation to the shaft 6 of the press knob by means of the ring piece 12 by the hand, whereat the grooves 27 facilitate the turning.

For adjusting the volume of the pipette, the press knob 5 is turned, whereby the shaft 6 of the press knob rotates inside the sleeve 20 and shortens or lengthens the stroke length of the piston 3. When the press knob 5 of the pipette is depressed by the thumb, first the sleeve 20 is detached from the limiter flange 22, and the movement goes on until the annular flange 11 meets the top face of the limiter flange 22. If the press knob 5 is depressed further with a higher force, overcoming the prestressing of the spring 13, the movement goes on as a so-called secondary movement until the skirt of the mantle 10 of the press knob 5 meets the top face of the annular flange 11.

At the bottom portion of the knob shaft 6, there is a sleeve 29 inside which the piston rod 4 remains. On the outside face of the sleeve 29, there are one or several grooves 30, which have been fitted so as to be jointly operative with the wedges 32 provided on the inside face of the ring 31, so that the grooves 30 turn the ring when the sleeve 29 is turned, but do not prevent longitudinal movement of the knob shaft 6 in relation to the ring 31. Above the ring 31, a spring 33 is fitted, whose globular projections 34 are suitable for operation jointly with the recesses 35 made into the end face of the ring 31. The projections 34 lock the ring 31 gently in the desired volume positions. The spring 33 is locked to the wedges 23 in the pipette frame 1 by means of brackets 36, which prevent rotation of the spring 33. On the face of the ring 31, there is toothing 37, which operates jointly with a cogwheel 38 and with a following ring 39 so that, when the ring 31 rotates to the desired extent, e.g. 60°, 90° or 360°, the cogwheel 38 rotates and moves the ring 39 over 1/10 of a revolution, i.e. 36°. Correspondingly, a greater number of intermediate cogwheels 38 and rings 39 may be provided in a stack so as to obtain a desired volume numbering.

Onto the faces of the rings 31, 39, numbers have been applied, the said numbers indicating the adjustment volume of the pipette, which is seen through the window 40. A four-number numeral may also be obtained by means of three rings so that the two numbers of numerals exceeding one thousand are placed on the first ring. In such a case, rotation of the ring 31 over more than 9 revolutions is prevented by means of a member placed on the knob shaft 6, which member may be a pin or a flange.

What is claimed is:

1. An improved pipette with adjustable dispensing volume comprising:

(a) a hollow frame portion forming a handle;

(b) a cylinder formed within said frame portion;

(c) a piston displaceably and sealably fitted within said cylinder;

(d) a piston rod coupled to said piston for displacing same;

(e) a threaded shaft disposed within said frame including an upper portion and a lower portion, the lower portion of said shaft engaging said piston rod to displace same;

(f) a calibration sleeve threaded to the upper portion of said threaded shaft to permit the total length of said sleeve and said threaded shaft to be adjusted by relative rotation thereof to thereby determine a lower limit of displacement of said piston;

(g) at least first and second coacting disc means coupled to said threaded shaft by a non-threaded sleeve attached thereto for reciprocal rotation between said disc means upon said relative rotation of said sleeve and said threaded shaft, said disc means having an upper, lower and peripheral surface, numerical indicia means disposed on the peripheral surface of said disc means for indicating calibrated dispensing volumes of said pipette and notches disposed on said upper surface of an uppermost one of said first and second disc means; and (h) an annular spring disposed adjacent said uppermost of said disc means, said spring being non-rotatably fitted to said frame portion, said spring including globular projections for releaseable engagement with said notches on said upper surface of said uppermost disc means so as to releaseably lock said disc means at various radial positions.

2. The pipette as claimed in claim 1 wherein said frame portion includes inwardly disposed wedges and said annular means comprises bracket means disposed transversely between said wedges for locking said spring means into place.

* * * * *